(12) United States Patent
Strandborg et al.

(10) Patent No.: US 12,469,209 B1
(45) Date of Patent: Nov. 11, 2025

(54) PIXEL-ACCURATE GRAPHICS RASTERIZATION FOR MULTISCOPIC DISPLAYS

(71) Applicant: Distance Technologies Oy, Helsinki (FI)

(72) Inventors: Mikko Strandborg, Hangonkylä (FI); Joona Petrell, Tampere (FI); Petteri Timonen, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/299,908

(22) Filed: Aug. 14, 2025

(51) Int. Cl.
| | |
|---|---|
| *G06T 1/20* | (2006.01) |
| *G06F 3/01* | (2006.01) |
| *G06T 7/90* | (2017.01) |
| *G06T 15/00* | (2011.01) |
| *G06T 15/04* | (2011.01) |
| *G06T 15/08* | (2011.01) |
| *G06T 15/20* | (2011.01) |
| *G06T 19/00* | (2011.01) |
| *G09G 3/00* | (2006.01) |
| *G02B 30/33* | (2020.01) |

(52) U.S. Cl.
CPC .............. *G06T 15/20* (2013.01); *G06F 3/013* (2013.01); *G06T 7/90* (2017.01); *G06T 15/04* (2013.01); *G06T 15/08* (2013.01); *G06T 19/006* (2013.01); *G09G 3/003* (2013.01); *G02B 30/33* (2020.01); *G06T 2207/10024* (2013.01); *G09G 2354/00* (2013.01)

(58) Field of Classification Search
CPC ........... G06T 15/20; G06T 7/90; G06T 15/04; G06T 15/08; G06T 19/006; G06T 2207/10024; G06F 3/013; G09G 3/003; G09G 2354/00; G02B 30/33
See application file for complete search history.

(56) References Cited

U.S. PATENT DOCUMENTS

2019/0347757 A1* 11/2019 Selvik ................. G06T 1/20

* cited by examiner

*Primary Examiner* — Deeprose Subedi
(74) *Attorney, Agent, or Firm* — ZIEGLER IP LAW GROUP, LLC.

(57) ABSTRACT

A 3D bounding volume within which a graphical element is to be rasterized for a given eye is determined. A set of light-emitting elements from which light is directed toward the given eye along a direction intersecting the 3D bounding volume is identified. For each light-emitting element in the set, its perceived shape and angular size from a perspective of the given eye is determined. The graphical element is rasterized onto the set of light-emitting elements based at least on relative perceived positions of the light-emitting elements from the perspective of the given eye, and their perceived shape and their perceived angular size. A colour value is computed for each light-emitting element in the set based on the rasterization of the graphical element. A synthetic light field is then produced displaying the graphical element, using computed colour values for the light-emitting elements in the set.

10 Claims, 4 Drawing Sheets

|   |   |   |   |   |   |   |   |   |   |
|---|---|---|---|---|---|---|---|---|---|
| 0 | 1 | 2 | 3 | 4 | 5 | 6 | 7 | 8 | 9 |
| 1 | 2 | 3 | 4 | 5 | 6 | 7 | 8 | 9 | 0 |
| 2 | 3 | 4 | 5 | 6 | 7 | 8 | 9 | 0 | 1 |
| 3 | 4 | 5 | 6 | 7 | 8 | 9 | 0 | 1 | 2 |
| 4 | 5 | 6 | 7 | 8 | 9 | 0 | 1 | 2 | 3 |
| 5 | 6 | 7 | 8 | 9 | 0 | 1 | 2 | 3 | 4 |
| 6 | 7 | 8 | 9 | 0 | 1 | 2 | 3 | 4 | 5 |
| 7 | 8 | 9 | 0 | 1 | 2 | 3 | 4 | 5 | 6 |
| 8 | 9 | 0 | 1 | 2 | 3 | 4 | 5 | 6 | 7 |
| 9 | 0 | 1 | 2 | 3 | 4 | 5 | 6 | 7 | 8 |

FIG. 1C

PIXEL-ACCURATE GRAPHICS RASTERIZATION FOR MULTISCOPIC DISPLAYS

TECHNICAL FIELD

The present disclosure relates to systems for performing rasterizations in multiscopic displays. The present disclosure also relates to methods for performing rasterizations in multiscopic displays.

BACKGROUND

Augmented-reality (AR) heads-up displays (HUDs) and other light field display systems typically render graphical elements by identifying, for each light-emitting element, a direction within a user's field of view along which emitted light will reach a given eye of the user. A corresponding colour value is then sampled at a location that matches the identified direction. This approach is well suited to rendering three-dimensional (3D) environments and virtual objects, where the output depends on spatial depth and surface shading.

However, in certain use cases, such as the rendering of text, user interface (UI) elements, or other forms of vector graphics, it is desirable to rasterize a graphical element directly and with high accuracy, without relying on intermediate resampling stages. Accurate rasterization in these cases is complicated by the optical configuration of multiscopic displays.

To produce multiscopic effects, a multiscopic display incorporates a multiscopic optical element that redirects light from different sets of light-emitting elements toward different viewing directions. When the multiscopic optical element is implemented as a lenticular array, a perceived layout of light-emitting elements may appear distorted, shifted, or even mirrored, depending on a viewing direction and a geometry of the lenticular array. Additionally, a perceived size of each light-emitting element may vary across the user's field of view, particularly for light-emitting elements located near edges of the lenticular array.

When the multiscopic optical element is implemented as a parallax barrier, additional irregularities may arise. Each eye may perceive discontinuous segments of light-emitting elements interrupted by opaque barriers, resulting in an alternating pattern of visible and non-visible regions. The positions and sizes of these segments depend on a geometry of the parallax barrier and the viewing direction. This leads to gaps and spatial discontinuities that are not modelled in conventional rendering pipelines, making it difficult for a client application to generate graphical elements that align correctly with the perceived output.

Further distortions may arise from additional optical elements positioned on the optical path between the multiscopic display and the user's eye. For example, a curved optical combiner may introduce geometric warping or magnification effects that shift the perceived location of graphical elements. In such systems, even small positional errors can cause perceptually significant rendering artifacts, particularly in the case of high-contrast two-dimensional (2D) graphics.

In some AR applications, such as mixed-reality night vision or mission-critical overlays, latency is a critical constraint. In these scenarios, the graphical elements must be generated and presented with minimal delay, leaving limited opportunity for intermediate processing stages, such as framebuffer composition, swapchain resampling, or late-stage projection corrections.

Accordingly, there exists a need for improved techniques that support low-latency rasterization of graphical elements in systems where the perceived layout of light-emitting elements is distorted and direction-dependent.

SUMMARY

The present disclosure seeks to provide a system and method for rasterizing graphical elements directly onto an array of light-emitting elements of a multiscopic display, without a need for an intermediate resampling step. The aim of the present disclosure is achieved by a system and a method in which graphical elements are rasterized directly onto a set of light-emitting elements that emit light toward a given eye of a user, based on a relative location of the given eye with respect to an image plane and optical distortion parameters of a multiscopic optical element, thereby enabling pixel-accurate (and sub-pixel-accurate) rendering of the graphical elements with low latency, as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 1C is a schematic illustration of a portion of an array of light-emitting elements, while

DETAILED DESCRIPTION OF EMBODIMENTS

Figure 1A:
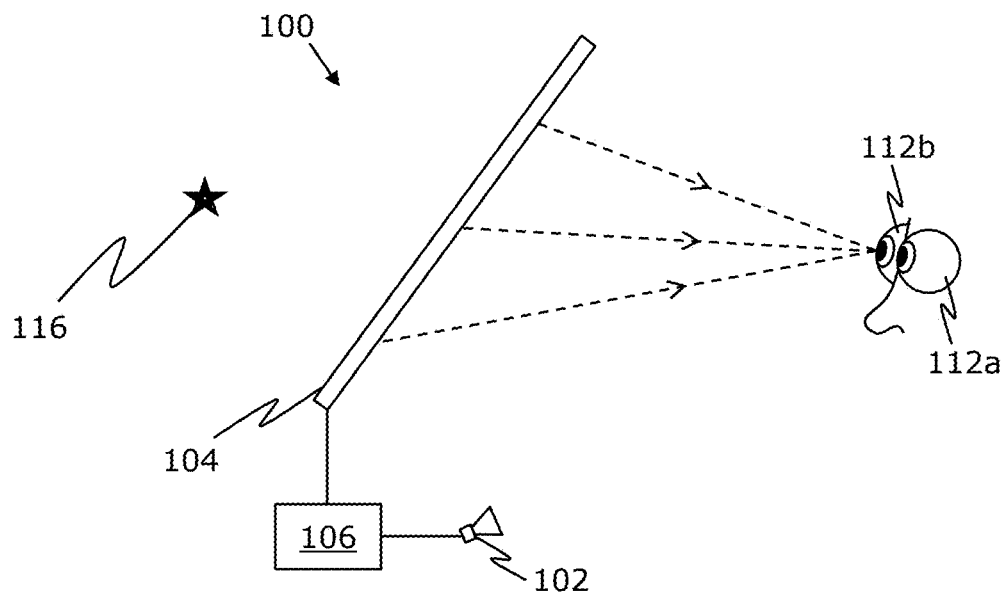
FIGS. 1A and 1B are schematic illustrations of a system for performing rasterizations in a multiscopic display, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  a tracker;
  a multiscopic display comprising:
    an array of light-emitting elements; and
    a multiscopic optical element arranged on an optical path of the array of light-emitting elements; and at least one processor configured to:
- determine a relative location of each eye of at least one user with respect to an image plane of the multiscopic display, using the tracker;
- determine a three-dimensional (3D) bounding volume within which at least one graphical element is to be rasterized for a given eye of an individual one of the at least one user, based on a relative location of the given eye with respect to the image plane;
- identify, for the given eye, a set of light-emitting elements in the array from which light, after passing through the multiscopic optical element, is directed toward the given eye along directions that intersect the 3D bounding volume;
- determine, for each light-emitting element in the set, a perceived shape and a perceived angular size of said light-emitting element from a perspective of the given eye, based on the relative location of the given eye with respect to the image plane, and optical distortion parameters of the multiscopic optical element;
- rasterize the at least one graphical element onto the set of light-emitting elements based at least on relative perceived positions of the light-emitting elements of the set from the perspective of the given eye, and the perceived shape and the perceived angular size of each light-emitting element;
- compute a colour value for each light-emitting element in the set based on the rasterization of the at least one graphical element; and
- produce a synthetic light field displaying the at least one graphical element via the multiscopic display, using computed colour values for the light-emitting elements in the set.

In a second aspect, an embodiment of the present disclosure provides a method comprising:
- determining a relative location of each eye of at least one user with respect to an image plane of a multiscopic display using a tracker, the multiscopic display comprising an array of light-emitting elements and a multiscopic optical element arranged on an optical path of the array;
- determining a three-dimensional (3D) bounding volume within which at least one graphical element is to be rasterized for a given eye of an individual one of the at least one user, based on a relative location of the given eye with respect to the image plane;
- identifying, for the given eye, a set of light-emitting elements in the array from which light, after passing through the multiscopic optical element, is directed toward the given eye along directions that intersect the 3D bounding volume;
- determining, for each light-emitting element in the set, a perceived shape and a perceived angular size of said light-emitting element from a perspective of the given eye, based on the relative location of the given eye with respect to the image plane, and optical distortion parameters of the multiscopic optical element;
- rasterizing the at least one graphical element onto the set of light-emitting elements based at least on relative perceived positions of the light-emitting elements of the set from the perspective of the given eye, and the perceived shape and the perceived angular size of each light-emitting element;
- computing a colour value for each light-emitting element in the set based on the rasterization of the at least one graphical element; and
- producing a synthetic light field displaying the at least one graphical element via the multiscopic display, using computed colour values for the light-emitting elements in the set.

The present disclosure provides the aforementioned system and the aforementioned method for rasterizing at least one graphical element directly onto a corresponding set of light-emitting elements of the multiscopic display, without a need for an intermediate resampling step. By determining the perceived shape and the perceived angular size of each light-emitting element in the identified set from the perspective of the given eye, the system and method enable view-dependent modelling of an effective geometry of the set of light-emitting elements as perceived by the given eye. This enables direct rasterization of the at least one graphical element onto the set of light-emitting elements. By computing colour values for the light-emitting elements in the set, based on such rasterization, the system and method provide direct control over the synthetic light field produced by the multiscopic display in accordance with an intended spatial appearance of the at least one graphical element for the given eye, without reliance on intermediate resampling or reprojection stages.

The system and method avoid the use of framebuffer-based composition, swapchain resampling and late-stage geometric corrections, making them suitable for latency-sensitive applications in which graphical output must reflect current user position and viewing direction with minimal delay. Because the rasterization process operates directly on the set of light-emitting elements contributing light toward the given eye, based on a modelled correspondence between viewing geometry and optical distortion, the system and method support pixel-accurate (and sub-pixel-accurate) rendering of the at least one graphical element under non-uniform, direction-dependent layouts of the array of light-emitting elements.

The system and method operate entirely through multiscopic rendering based on view-dependent modelling of the effective geometry of the array of light-emitting elements as perceived by the given eye. As a result, they are compatible with a wide range of optical architectures used in multiscopic and augmented-reality (AR) display systems.

It will be appreciated that the system can be implemented as a heads-up display (HUD) in a vehicle. In some implementations, the multiscopic display may be implemented as a transparent display integrated into a windshield of the vehicle. One example of such a transparent display is described in U.S. patent application Ser. No. 18/818,717, titled "Augmenting Reality with Multiscopic See-through Display", which is incorporated herein by reference. In other implementations, the multiscopic display may be implemented as a non-transparent display used in conjunction with an optical combiner integrated into the windshield. In such implementations, the optical combiner is arranged on an optical path of the non-transparent display and an optical path of a real-world light field of a real-world environment.

For illustration purposes only, there will now be described how the aforementioned steps can be performed. It will be appreciated that the steps have been described with respect to the given eye of the individual one of the at least one user. These steps may be performed similarly for each eye of each individual one of the at least one user.

Determining 3D Bounding Volume:

In some implementations, determining the 3D bounding volume within which the at least one graphical element is to be rasterized for the given eye comprises determining a spatial region in a coordinate space defined with respect to the multiscopic display or with respect to at least one real-world reference object present in the real-world environment. For example, when the system is implemented as an HUD in a vehicle, the at least one real-world reference object may include a corner of a windshield of the vehicle, a portion of a bonnet of the vehicle, and/or a real-world object identified in a real-world image captured using at least one real-world-facing camera. The 3D bounding volume may be pre-determined by a software application or a rendering pipeline as a geometric construct (for example, a box, a sphere, a convex hull, or similar) that encompasses a spatial extent of the at least one graphical element intended to appear at a designated location in a field of view of the given eye.

Optionally, a position and an orientation of the 3D bounding volume are anchored to the at least one graphical element. For example, a graphical element associated with a flat surface intended to appear at a specific depth plane may have a corresponding 3D bounding volume that is determined based on an optical depth corresponding to the specific depth plane, and a position and dimensions of the graphical element.

Moreover, optionally, the position and the orientation of the 3D bounding volume are adjusted based on a change in the relative location of the given eye (for example, due to user motion). Such a dynamic adjustment allows for efficient identification of the set of light-emitting elements that are relevant for generating a view-dependent synthetic light field corresponding to the at least one graphical element as perceived by the given eye.

Identifying Set of Light-Emitting Elements:

In some implementations, identifying the set of light-emitting elements in the array from which light is directed, after passing through the multiscopic optical element, toward the given eye along directions that intersect the 3D bounding volume comprises modelling directional light paths of individual light-emitting elements based on the optical distortion parameters of the multiscopic optical element. Each light-emitting element has a corresponding emission direction or angular range of emission directions, which is determined based on the optical distortion parameters of the multiscopic optical element. The optical distortion parameters could include at least one of: a refractive index of a material of the multiscopic optical element, a focal length of a single multiscopic cell (such as a lenticular lens) of the multiscopic optical element, a thickness of the multiscopic optical element, a pitch of the multiscopic optical element, a phase of the multiscopic optical element relative to the array of light-emitting elements.

For each light-emitting element in the array, a forward projection may be performed to determine the direction in which light emitted by said light-emitting element is redirected by the multiscopic optical element. This forward projection is computed based on a spatial position of the light-emitting element within the array, the optical distortion parameters of the multiscopic optical element, and the relative location of the given eye with respect to the image plane of the multiscopic display. A direction vector resulting from this forward projection defines a ray in 3D space representing the direction in which the light from said light-emitting element travels toward the eye.

If the direction of this ray intersects the 3D bounding volume, either along the forward projection or when extended (that is, back-projected) in an opposite direction, the light-emitting element is included in the identified set for the given eye. Notably, back-projection may be used to determine such intersection where the 3D bounding volume is at an optical depth that is greater than a native optical distance between the multiscopic display and the given eye. The term "native optical distance" refers to an optical distance between the multiscopic display and the given eye along an optical path of the synthetic light field.

This identification process ensures that only those light-emitting elements that contribute light along a direction intersecting the 3D bounding volume, as perceived by the given eye, are included in the rasterization process. As a result, the system and method support view-dependent rendering that accurately reflects the perceived placement of the at least one graphical element within the 3D space defined by the user's viewing geometry.

Determining Perceived Shape and Perceived Angular Size:

In some implementations, determining the perceived shape and the perceived angular size of each light-emitting element in the set comprises computing a projection of a shape of a physical aperture of the light-emitting element onto a sphere centred at a location of the given eye. This projection may be modelled based on the optical distortion parameters of the multiscopic optical element and the spatial position of the light-emitting element within the array.

Additionally or alternatively, optical ray tracing or geometric approximation techniques may be used to determine an apparent distortion of the shape of the physical aperture of the light-emitting element shape by the multiscopic optical element. Such apparent distortion may, for example, include stretching or shearing. The perceived shape and the perceived angular size may be determined using calibration data or analytical formulations that account for lens-induced magnification, parallax displacement, and/or aberration correction, depending on a type of the multiscopic optical element.

The perceived angular size may be defined in terms of a solid angle (e.g., steradians) subtended by the projected shape, or as a cone angle measured along principal axes. The perceived shape may be approximated as a polygonal region whose angular extents define a bounded region within the field of view of the given eye.

Determining Relative Perceived Positions:

In some implementations, the relative perceived positions of the light-emitting elements in the set are determined by calculating direction vectors from the given eye toward centre points of the light-emitting element in the set, as redirected through the multiscopic optical element. These direction vectors are calculated based on the optical distortion parameters of the multiscopic optical element. As an example, in a case where the multiscopic optical element is a lenticular array, the relative perceived positions of the light-emitting elements can be determined based on whether a focal length of a lenticular lens in the lenticular array is greater than or smaller than an effective thickness of the lenticular lens along the viewing direction of the given eye.

Each direction vector defines an angular origin point in the field of view of the given eye. An angular separation between angular origin points corresponding to different direction vectors of the light-emitting elements is used to determine the relative perceived positions of the light-emitting elements. The angular origin points may be defined on an imaginary surface corresponding to an outermost surface of the multiscopic optical element from which the redirected light exits.

Rasterizing Graphical Element onto Set of Light-emitting Elements:

Rasterizing the at least one graphical element onto the set of light-emitting elements, based on the relative perceived positions, the perceived shapes, and the perceived angular sizes, may include determining, for each light-emitting element in the set, whether and how an angular projection of the at least one graphical element overlaps with an angular region subtended by the light-emitting element, as perceived from the given eye. This angular region is defined by the perceived shape and the perceived size of the light-emitting element. In some implementations, the at least one graphical element is rasterized by mapping it from an angular rendering space onto a non-uniform layout formed by the relative perceived positions, the perceived shapes and the perceived sizes of the light-emitting elements.

The rasterization may be image-based, such as when performed based on an image of the at least one graphical element (e.g., bitmap font or texture lookup). Alternatively, the rasterization may be vector-based, such as when performed based on a vector representation of the at least one graphical element (e.g., using Bézier curves or other vector primitives). The system may support either or both types of rasterization depending on the application context.

The rasterization may include anti-aliasing, by weighting colour contributions based on a degree of an overlap between the at least one graphical element and the angular region of each light-emitting element. This mapping may be implemented in a shader program executing on a graphics processing unit (GPU), where each light-emitting element is treated as an individually addressed output sample with a unique shape and position.

Computing Colour Values:

Computing a colour value for each light-emitting element in the set based on the rasterization may comprise sampling the at least one graphical element at a location corresponding to the perceived angular position of the light-emitting element. Throughout the present disclosure, the term "colour value" encompasses both colour and intensity of a given light-emitting element. If the at least one graphical element is represented as a vector graphic, this may include evaluating a curve or glyph primitive at the location of the light-emitting element, based on its perceived angular size and shape.

Once colour values have been computed for all light-emitting elements in the set, the synthetic light field is produced by driving each light-emitting element to emit light with an intensity corresponding to its respective computed colour value. After being directionally filtered by the multiscopic optical element, the synthetic light field presents the at least one graphical element at its intended position and size within the field of view of the given eye. In this way, respective colour values for the light-emitting elements that emit light toward eyes of the at least one user are computed based on respective relative locations of the eyes of the at least one user, whilst taking into account the optical distortion parameters of the multiscopic optical element.

In some implementations, the rasterization can be performed on the GPU. In other implementations, the rasterization can be performed on a central processing unit (CPU), a custom application-specific integrated circuit (ASIC), or any other kind of processor.

In an example implementation where the rasterization is performed on the GPU, this may be achieved as follows:

During composition, the shader program executing on the GPU may invoke an application-provided shader subroutine for each light-emitting element in the set.

Alternatively, immediately after execution of the shader program (either for a full frame or for a rendering stripe in case of striped rendering), the application may inject additional rendering commands. These commands may leverage runtime-provided shader libraries and parameter blocks to position the at least one graphical element at correct locations on the image plane of the multiscopic display.

Various techniques for GPU-driven text rendering are well-known in the art and may be leveraged in these implementations. These techniques may be adapted for use in the system and the method described herein by performing font rasterization directly within a pixel shader program. As an example, the rasterization of a text glyph may involve evaluating Bezier curve primitives for each light-emitting element in the set. This evaluation is performed based on the perceived angular size and the perceived shape of each light-emitting element, instead of a native pixel location and a pixel size. In this regard, the size of the light-emitting element may be determined using built-in shader functions, such as fwidth ( ) modified to account for the view-dependent geometry and the optical distortion parameters. A runtime framework can be used to provide data to the pixel shader program to enable this view-dependent rasterization, ensuring that text glyphs and other vector-based graphical elements are positioned and scaled accurately on the array of light-emitting elements. This enables accurate production of the synthetic light field in accordance with the intended spatial appearance of the at least one graphical element for the given eye. Throughout the present disclosure, the terms "glyph" and "Bézier curve" are understood in accordance with their ordinary meaning in the field of computer graphics and rendering.

Furthermore, in some implementations, the system further comprises an optical combiner arranged on an optical path of the multiscopic display. In such implementations, the perceived shape and the perceived angular size of each light-emitting element in the set are determined based further on a curvature of the optical combiner.

To account for the curvature, a mapping function may be determined that transforms the angular region subtended by each light-emitting element, after redirection by the multiscopic optical element, based on a geometric model of the curvature of the optical combiner. This geometric model may include at least one parameter comprising at least one of: radii of curvature along different axes, a relative orientation of the optical combiner with respect to the multiscopic display, optical distances between the multiscopic display and different points on a semi-reflective surface of the optical combiner. In some implementations, ray tracing or analytical projection techniques may be applied to determine how the optical combiner redirects and/or magnifies rays before they reach the given eye.

The perceived angular size of the light-emitting element may thus be affected by curvature-induced magnification or compression. Similarly, the perceived shape may be distorted (for example, elongated along one axis) depending on the curvature and an incidence angle of the ray at the semi-reflective surface. These effects are incorporated into computation of the angular region subtended by the light-emitting element, thereby improving the accuracy of the rasterization process.

Taking into account the curvature of the optical combiner when determining the perceived shape and the perceived angular size of each light-emitting element in the set enables more accurate view-dependent modelling of the geometry of the light-emitting elements from the perspective of the given eye. This improves the fidelity of the rasterization process in implementations where the optical combiner introduces geometric warping, magnification, or displacement of the synthetic light field. As a result, graphical elements are displayed with improved alignment, scale, and spatial consistency, even in the presence of a curved optical combiner. This is particularly beneficial in AR applications, such as HUDs, where curved optical combiners are commonly used to merge graphical elements with real-world objects.

By incorporating the curvature into the view-dependent modelling, accurate spatial appearance of high-contrast or precision-sensitive graphical elements (such as text font, UI overlays, and targeting markers) is maintained. This enhances legibility, usability, and user confidence in mission-critical AR scenarios.

Moreover, optionally, the at least one processor is configured to determine, for each light-emitting element in the set, a perceived angular distance between said light-emitting element and at least one neighbouring light-emitting element in the set, from the perspective of the given eye, wherein the at least one graphical element is rasterized based further on the perceived angular distance.

In some implementations, determining the perceived angular distance between the light-emitting element and the at least one neighbouring light-emitting element comprises computing an angular separation between direction vectors corresponding to the light-emitting element and the at least one neighbouring light-emitting element, as redirected through the multiscopic optical element toward the given eye. These direction vectors are calculated based on the optical distortion parameters of the multiscopic optical element and the relative location of the given eye. Each direction vector defines a path along which redirected light reaches the given eye. The perceived angular distance is measured as an angle between these direction vectors.

The perceived angular distance captures how far apart the light-emitting element and the at least one neighbouring light-emitting element appear from the perspective of the given eye. It is distinct from the perceived angular size of an individual light-emitting element, and reflects potential discontinuities in an apparent layout of the light-emitting elements (for example, such as those introduced by opaque portions in a parallax barrier or lens boundaries in a lenticular array). It will be appreciated that the at least one neighbouring light-emitting element could include at most four neighbouring light-emitting elements in some implementations.

During rasterization, the perceived angular distance may be used to take decisions about connectivity, spacing, and interpolation across the layout. For example, in regions where large angular gaps exist between adjacent light-emitting elements, anti-aliasing blending may be suppressed to avoid visual artifacts across optically non-contiguous regions. Alternatively, rasterization may be omitted across such gaps to preserve visual coherence.

Additionally, the perceived angular distance can be used to subdivide the set of light-emitting elements into sub-regions of relatively uniform angular spacing. This enables localized rasterization operations that adapt to a density and a structure of the apparent layout, improving both performance and rendering accuracy.

By incorporating the perceived angular distance, the system accounts for view-dependent irregularities and disconnections in the layout of the light-emitting elements. This improves control over the spatial distribution of rasterized graphical elements, especially in sparse or non-uniform regions. In particular, it enables suppression of interpolation across subregions where optical separation would otherwise lead to colour bleeding. This preserves the clarity of edges and the geometric accuracy of features such as text font, icons, and vector shapes. As a result, the at least one graphical element is rasterized with improved spacing fidelity, reduced visual aliasing, and minimal shape distortion, even under complex angular layouts caused by the multiscopic optical element.

Furthermore, optionally, the system further comprises at least one real-world-facing camera, wherein the at least one processor is configured to:
  capture at least one real-world image of a real-world environment whose real-world light field is optically combined with the synthetic light field, using the at least one real-world-facing camera; and
  determine, for each light-emitting element in the set, at least one of: (i) a colour of a portion of the real-world light field corresponding to a direction in which light from said light-emitting element is directed, (ii) an intensity of said portion of the real-world light field, (iii) a distance between the given eye and a real-world object located along said direction, (iv) a motion vector indicating motion of the real-world object relative to the image plane, based on the at least one real-world image,
wherein the colour value for said light-emitting element is computed based further on the at least one of: (i) the colour, (ii) the intensity, (iii) the distance, (iv) the motion vector.

In this regard, the at least one real-world image is analysed to determine, for each light-emitting element in the set, at least one parameter of the real-world environment along the direction in which the light from said light-emitting element is redirected toward the given eye by the multiscopic optical element. This direction is determined based on the previously-described forward projection, taking into account the relative location of the given eye and the optical distortion parameters of the multiscopic optical element.

The at least one real-world image may be sampled along this direction to determine at least one of: (i) the colour, (ii) the intensity. The colour of the portion of the real-world light field corresponds to a colour of a real-world region from which light is expected to arrive to the given eye along the direction. The intensity of the portion of the real-world light field corresponds to an intensity value representing a luminance of the real-world region.

The distance between the given eye and the real-world object located along said direction may be determined using a depth map captured by at least one depth camera, along with the at least one real-world image. Alternatively or additionally, the distance may be determined using stereo image processing, when the at least one real-world-facing camera comprises two or more real-world-facing cameras. The distance is determined based on the relative location of the given eye with respect to the image plane.

The motion vector indicating the motion of the real-world object relative to the image plane may be determined through optical flow analysis or other motion estimation techniques applied to a sequence of real-world images captured by the at least one real-world-facing camera.

The at least one parameter of the real-world environment is then used to modulate the colour value computed for the light-emitting element. As an example, if the real-world region along the direction is particularly bright (namely, if the intensity of said portion of the real-world light field is greater than a predefined threshold intensity), a contribution of synthetic light may be reduced to avoid glare or contrast loss. As another example, the colour of the real-world region may be used to compute a complementary or blended synthetic colour that enhances visibility while preserving contextual harmony.

Shading, transparency, or depth-based emphasis of the at least one graphical element may be modulated based on the distance between the given eye and the real-world object. Additionally, optionally, if a virtual depth at which the at least one graphical element is being presented is smaller than a first predefined threshold distance, while the distance between the given eye and the real-world object is larger than a second predefined threshold distance, a defocus blur may be applied to the real-world image prior to determining at least one of: (i) the colour of the portion of the real-world light field, (ii) the intensity of said portion. The second predefined threshold distance is larger than the first predefined threshold distance. As an example, the first predefined threshold difference may lie in a range of 0.25 metre to 2 metres, while the second predefined threshold difference may lie in a range of 2 metres to 10 metres.

Motion vectors may be used to perform at least one of: temporal filtering, adaptive luminance, predictive rendering, to reduce latency or motion blur. For example, a graphical element may be rendered more prominently when it appears over a moving real-world object, improving situational awareness.

The system provides improved control over how the at least one graphical element interacts with real-world object(s) along shared optical paths. By determining the at least one parameter of the real-world environment (such as colour, intensity, depth, and motion) along the same directions in which light from the light-emitting elements is directed, the system enables context-aware rendering of graphical elements that appear seamlessly integrated into the real-world scene.

This approach allows the synthetic light field to be adapted dynamically to changing lighting and environmental conditions. For example, the colour or the luminance of the at least one graphical element overlaid on the real-world objects can be adjusted based on local contrast with the background, improving legibility in bright or low-light conditions.

Incorporating the depth and motion vectors further allows intelligent prioritization of the at least one graphical element. This allows critical UI overlays, text fonts, and markers to remain visible and visually distinct even in dynamic, cluttered environments.

Computing colour values for light-emitting elements based on the at least one parameter of the real-world environment enables perceptual integration between graphical elements (namely, virtual objects) and a real-world scene, enhancing realism, contrast sensitivity, and user comfort, particularly in AR applications where synthetic and real-world light fields coexist in the user's field of view.

Overall, this capability improves usability in time-critical AR scenarios such as driving, navigation, and night vision, where awareness of and adaptation to real-world lighting and motion conditions are essential.

Moreover, optionally, the at least one processor is configured to:
  determine a gaze direction of each eye of the at least one user, using the tracker; and
  select, from among a plurality of graphical elements, the at least one graphical element to be rasterized for the given eye, based on a gaze direction of the given eye.

This selection process may involve evaluating spatial relationships between the gaze direction and respective intended positions of the plurality of graphical elements in the field of view. As an example, graphical elements that fall within a predefined angular region centred around the gaze direction (i.e., a foveal region or a gaze cone) may be prioritized for rasterization, while graphical elements outside the predefined angular region may be deprioritized or rendered at a lower resolution.

By determining the gaze direction of each eye and selecting graphical elements for rasterization based on this gaze direction, the system and method enable view-dependent prioritization of content. This allows the rendering pipeline to allocate computational and display resources efficiently by focusing on graphical elements that lie within the predefined angular region, namely graphical elements that are most relevant to the user's current line of sight.

This approach reduces unnecessary processing for graphical elements located outside the user's foveal or parafoveal vision, enabling lower latency and reduced power consumption in resource-constrained environments such as AR HUDs.

Moreover, by adapting graphical element selection dynamically to the user's gaze, the system supports context-aware rendering in which high-priority graphical elements (e.g., text labels, navigational markers, or interactive UI elements) are emphasized when they fall within the gaze region. This improves usability, legibility, and responsiveness in scenarios where rapid user attention shifts are common.

In addition, gaze-based selection ensures that only graphical elements likely to be perceived by the user are rasterized and presented with low latency, optimizing the perceptual coherence of the displayed content. This is particularly beneficial in applications requiring situational awareness, such as driving assistance, aviation HUDs, and mission-critical AR overlays.

Additionally, optionally, the at least one graphical element is selected based further on at least one of: a size, an importance level, a type of graphical element. The importance level can be in a form of a classification/tag. As an example, each individual graphical element may be classified as any one of: critical, high, normal. Alternatively, the importance level can be in a form of a numerical value. For example, if the importance level is higher than a first predefined threshold level, the graphical element can be considered to have critical importance. If the importance level lies between the first predefined threshold level and a second predefined threshold level, the graphical element can be considered to have high importance. If the importance level lies below the second predefined threshold level, the graphical element can be considered to have normal importance. Herein, the first predefined threshold level is greater than the second predefined threshold level. The type of graphical element may, for example, indicate whether the graphical element is a UI overlay, a warning, a navigation prompt, or a background marker.

This priority-driven content management approach ensures that critical or highly relevant graphical elements, such as warnings, navigation prompts, or interactive UI overlays, are prioritized for rasterization and displayed prominently, even if they fall outside the user's immediate gaze region. Conversely, less important or background elements may be deprioritized or rendered at lower resolution, conserving computational and display resources.

By classifying and weighting graphical elements based on application-defined thresholds, the system adapts seamlessly to diverse AR use cases, ranging from driving assistance and aviation HUDs to mission-critical overlays in mixed-reality systems. As a result, users experience a streamlined, context-aware visual output where essential information is highlighted, and distractions are minimized.

For illustration purposes only, there will now be described how various components of the system can be implemented.

The at least one processor controls an overall operation of the system. The at least one processor is communicably coupled to the tracker, the multiscopic display and, optionally, the at least one real-world-facing camera. Optionally, the at least one processor is implemented as a processor of the multiscopic display. Alternatively, optionally, the at least one processor is implemented as a processor of a computing device that is communicably coupled to the multiscopic display. Examples of the computing device include, but are not limited to, a laptop, a desktop, a tablet, a phablet, a personal digital assistant, a workstation, and a console. Examples of the processor include, but are not limited to, GPU, CPU and ASIC. Additionally, optionally, the at least one processor is implemented at least in part as a cloud server (namely, a remote server) that provides a cloud computing service.

Throughout the present disclosure, the term "tracker" refers to a specialised equipment for detecting and/or tracking relative locations of eyes of a given user. In some implementations, the tracker is also used for determining gaze directions of the user's eyes. Optionally, the tracker is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (namely, the at least one visible-light camera, the at least one IR camera, the at least one depth camera) may be utilised in the tracker. When different types of images captured by the various different types of tracking cameras are utilised, the relative location of the user's eyes can be determined highly accurately, as results obtained from one type of image can be used to refine results obtained from another type of image. Herein, these different types of images constitute the tracking data collected by the tracker, and may be in the form of at least one of: visible-light images, IR images, depth images. It will be appreciated that the tracker tracks both eyes of the at least one user with a significantly high accuracy and precision, such that an error in determining the relative locations may, for example, be minimised to within a tolerance range of approximately (+/−) 8 millimetres.

Pursuant to embodiments of the present disclosure, different types of multiscopic displays can be implemented. For example, the multiscopic display can be any one of: hogel-based, lenticular array-based, parallax barrier-based. Depending on the type of the multiscopic display, the multiscopic optical element can be a lenticular array, a parallax barrier, or similar.

The term "light-emitting element" as used herein refers to any individually controllable emitter in the multiscopic display, including pixels, subpixels, or other display sampling units (such as emissive samples in a multisampling configuration).

The image plane of the multiscopic display can be a light-emitting surface of the multiscopic display or an imaginary plane that is parallel to the light-emitting surface, in a case where the multiscopic display is being directly viewed. Alternatively, the image plane can be an imaginary plane in another case where the optical combiner is employed to facilitate a reflected view. The term "image plane" refers to an intended location in space where the at least one graphical element is perceived. This does not require the multiscopic display or other optical elements on the optical path to be physically planar. This definition applies irrespective of the optical configuration of the system, namely:
  (i) in a case where a distorted image is displayed on a curved or non-curved display and reflected through a curved combiner,
  (ii) in a case where an undistorted image is displayed on a non-curved display and reflected through a non-curved combiner,
  (iii) in a case where an image is displayed on the multiscopic display and viewed directly (without any optical combiner).

The present disclosure also relates to the method as described above. Various embodiments and variants disclosed above, with respect to the aforementioned first aspect, apply mutatis mutandis to the method. Optionally, in the method, the perceived shape and the perceived angular size of each light-emitting element in the set are determined based further on a curvature of an optical combiner arranged on an optical path of the multiscopic display. This allows the method to account for geometric warping, magnification, and displacement effects introduced by the optical combiner. This enables accurate view-dependent modelling of graphical elements, ensuring correct alignment, scale, and spatial consistency in the user's field of view. As a result, the method provides improved fidelity and legibility of graphical elements in AR applications, particularly in HUDs where curved optical combiners are commonly used to merge virtual and real-world scenes.

Moreover, optionally, the method further comprises determining, for each light-emitting element in the set, a perceived angular distance between said light-emitting element and at least one neighbouring light-emitting element in the set, from the perspective of the given eye, wherein the at least one graphical element is rasterized based further on the perceived angular distance. This allows the method to account for view-dependent irregularities and spatial discontinuities in the layout of the multiscopic display. This enables adaptive rasterization that preserves spacing fidelity and suppresses unwanted interpolation across optically disconnected regions. As a result, the method improves the clarity and geometric accuracy of graphical elements, such as text, icons, and vector shapes, even in displays with non-uniform or sparse angular layouts.

Furthermore, optionally, the method further comprises:
  capturing at least one real-world image of a real-world environment whose real-world light field is optically combined with the synthetic light field, using at least one real-world-facing camera; and
  determining, for each light-emitting element in the set, at least one of: (i) a colour of a portion of the real-world light field corresponding to a direction in which light from said light-emitting element is directed, (ii) an intensity of said portion of the real-world light field, (iii) a distance between the given eye and a real-world object located along said direction, (iv) a motion vector indicating motion of the real-world object relative to the image plane, based on the at least one real-world image, wherein the colour value for said light-emitting element is computed based further on the at least one of: (i) the colour, (ii) the intensity, (iii) the distance, (iv) the motion vector.

This enables context-aware modulation of graphical elements, allowing them to adapt dynamically to real-world lighting, contrast, and movement, enhancing perceptual integration with the real-world environment. As a result, graphical elements maintain high visibility, legibility, and realism in AR applications where synthetic and real-world light fields coexist within the user's field of view.

Moreover, optionally, the method further comprises:
determining a gaze direction of each eye of the at least one user, using the tracker; and
selecting, from among a plurality of graphical elements, the at least one graphical element to be rasterized for the given eye, based on a gaze direction of the given eye.

This enables view-dependent prioritization of content. This ensures that high-priority graphical elements within the user's foveal or parafoveal region are rendered with minimal latency and maximum clarity, while deprioritizing less relevant elements. As a result, the method improves usability, responsiveness, and situational awareness in AR applications such as driving assistance, aviation HUDs, and mission-critical overlays.

DETAILED DESCRIPTION OF THE DRAWINGS

Figure 1B:
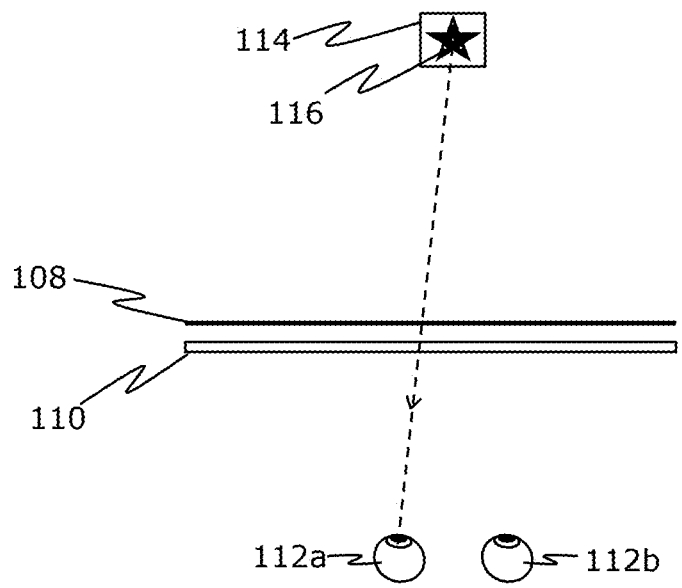

FIGS. 1A and 1B are schematic illustrations of a system 100 for performing rasterization in a multiscopic display, in accordance with an embodiment of the present disclosure. The system 100 comprises a tracker 102, a multiscopic display 104, and at least one processor depicted as a processor 106. The multiscopic display 104 comprises an array 108 of light-emitting elements, and a multiscopic optical element 110 arranged on an optical path of the array 108 of light-emitting elements. The processor 106 is configured to:
determine a relative location of each eye 112a-112b of at least one user with respect to an image plane of the multiscopic display 104, using the tracker 102;
determine a three-dimensional (3D) bounding volume 114 within which at least one graphical element 116 is to be rasterized for a given eye 112a of an individual one of the at least one user, based on a relative location of the given eye 112a with respect to the image plane;
identify, for the given eye 112a, a set of light-emitting elements in the array 108 from which light, after passing through the multiscopic optical element 110, is directed toward the given eye 112a along directions that intersect the 3D bounding volume 114;
determine, for each light-emitting element in the set, a perceived shape and a perceived angular size of said light-emitting element from a perspective of the given eye 112a, based on the relative location of the given eye 112a with respect to the image plane, and optical distortion parameters of the multiscopic optical element 110;
rasterize the at least one graphical element 116 onto the set of light-emitting elements based at least on relative perceived positions of the light-emitting elements of the set from the perspective of the given eye 112a, and the perceived shape and the perceived angular size of each light-emitting element;
compute a colour value for each light-emitting element in the set based on the rasterization of the at least one graphical element 116; and
produce a synthetic light field displaying the at least one graphical element 116 via the multiscopic display 104, using computed colour values for the light-emitting elements in the set.

Figure 1D:
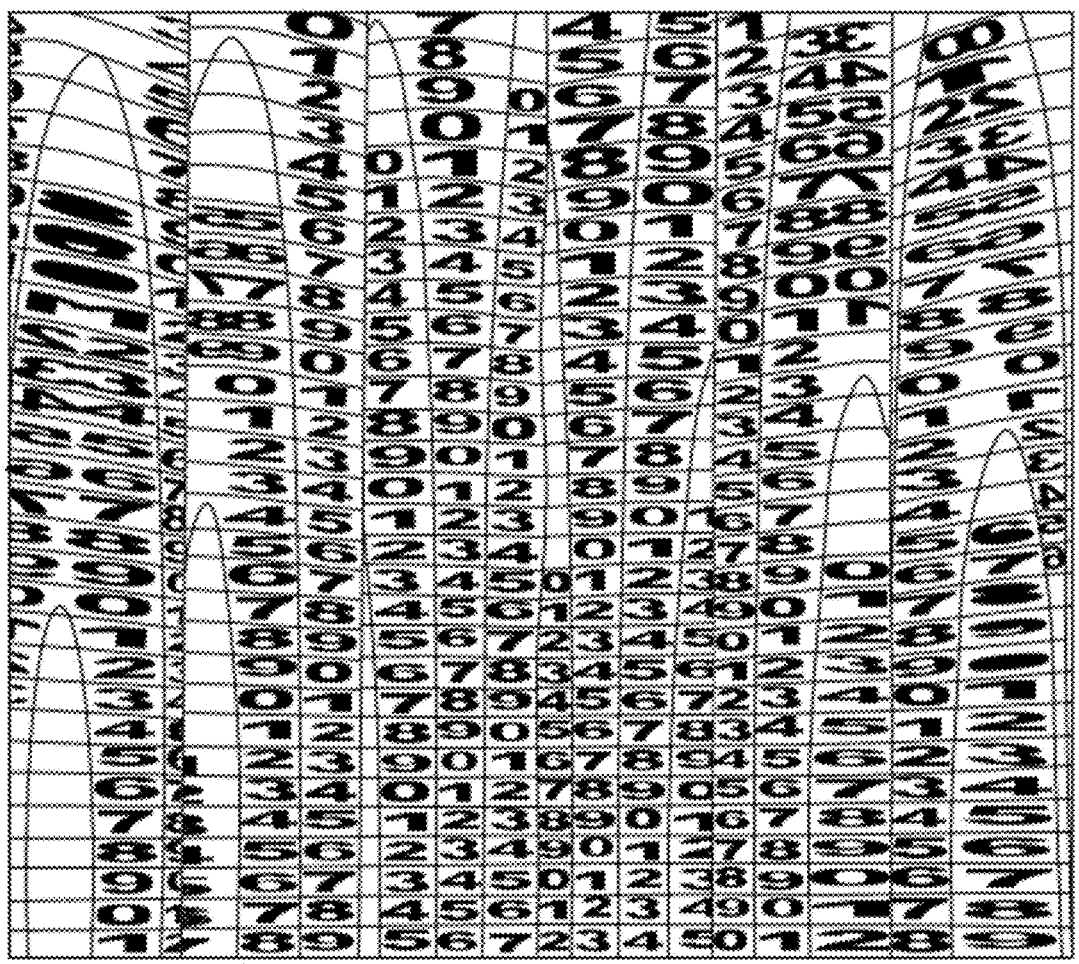
FIG. 1D is a schematic illustration of how light emanating from the light-emitting elements in the portion is perceived by a given eye after passing through a lenticular lens.

FIG. 1C is a schematic illustration of a portion of the array 108 having 10×10 light-emitting elements. Numbers have been assigned as identifiers to distinguish the light-emitting elements from other neighbouring light-emitting elements. FIG. 1D is a schematic illustration showing how light emanating from the light-emitting elements in said portion is perceived by the given eye 112a after passing through a lenticular lens. With reference to FIG. 1D, perceived shapes, perceived angular sizes and relative perceived positions of the light-emitting elements in the portion from the perspective of the given eye 112a are illustrated by distortions and mirroring in the identifiers assigned to the light-emitting elements. As shown, the distortion of the light-emitting elements in said portion varies with the viewing direction of the given eye 112a. Moreover, certain light-emitting elements subtend a larger angular region in the user's field of view compared to other light-emitting elements. As an example, light-emitting elements located near left and right edges of the lenticular lens exhibit greater distortion. Such distortion depends on a focal length of the lenticular lens and a viewing distance between the given eye 112a and the light-emitting elements.

It may be understood by a person skilled in the art that FIGS. 1A and 1B include a simplified example implementation of the system 100, for sake of clarity, which should not unduly limit the scope of the claims herein. It is to be understood that a specific implementation of the system 100 is not to be construed as limiting it to specific numbers or types of trackers, multiscopic displays and processors. A person skilled in the art will recognize many variations, alternatives, and modifications of embodiments of the present disclosure. For example, the multiscopic display may be reflectively viewed via an optical combiner in some implementations.

Figure 2:
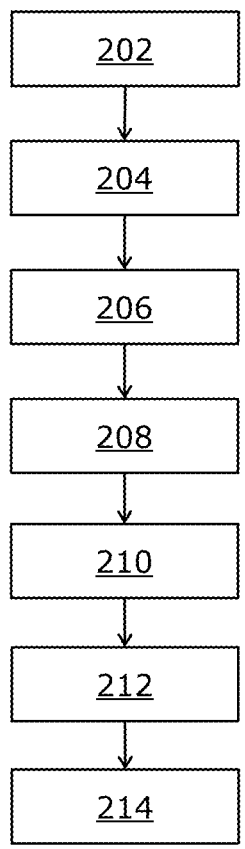
FIG. 2 illustrates steps of a method for performing rasterizations in a multiscopic display, in accordance with an embodiment of the present disclosure.

Referring to FIG. 2, illustrated are steps of a method for performing rasterization in a multiscopic display, in accordance with an embodiment of the present disclosure. At step 202, a relative location of each eye of at least one user with respect to an image plane of a multiscopic display is determined, using a tracker. The multiscopic display comprises an array of light-emitting elements, and a multiscopic optical element arranged on an optical path of the array of light-emitting elements. At step 204, a 3D bounding volume within which at least one graphical element is to be rasterized for a given eye of an individual one of the at least one user is determined, based on a relative location of the given eye with respect to the image plane. At step 206, a set of light-emitting elements in the array from which light, after passing through the multiscopic optical element, is directed toward the given eye along directions that intersect the 3D bounding volume is identified. At step 208, a perceived shape and a perceived angular size of each light-emitting element in the set from a perspective of the given eye is determined, based on the relative location of the given eye with respect to the image plane and optical distortion parameters of the multiscopic optical element. At step 210, the at least one graphical element is rasterized onto the set of light-emitting elements based at least on relative perceived positions of the light-emitting elements of the set from the perspective of the given eye, and the perceived shape and the perceived angular size of each light-emitting element. At step 212, a colour value is computed for each light-emitting element in the set based on the rasterization of the at least one graphical element. At step 214, a synthetic light field displaying the at least one graphical element is produced via the multiscopic display, using computed colour values for the light-emitting elements in the set.

The aforementioned steps are only illustrative and other alternatives can also be provided where one or more steps are added, or one or more steps are provided in a different sequence without departing from the scope of the claims herein.

The invention claimed is:

1. A system comprising:
   a tracker;
   a multiscopic display comprising:
   an array of light-emitting elements; and
   a multiscopic optical element arranged on an optical path of the array of light-emitting elements; and
   at least one processor configured to:
   determine a relative location of each eye of at least one user with respect to an image plane of the multiscopic display, using the tracker;
   determine a three-dimensional (3D) bounding volume within which at least one graphical element is to be rasterized for a given eye of an individual one of the at least one user, based on a relative location of the given eye with respect to the image plane;
   identify, for the given eye, a set of light-emitting elements in the array from which light, after passing through the multiscopic optical element, is directed toward the given eye along directions that intersect the 3D bounding volume;
   determine, for each light-emitting element in the set, a perceived shape and a perceived angular size of said light-emitting element from a perspective of the given eye, based on the relative location of the given eye with respect to the image plane, and optical distortion parameters of the multiscopic optical element;
   rasterize the at least one graphical element onto the set of light-emitting elements based at least on relative perceived positions of the light-emitting elements of the set from the perspective of the given eye, and the perceived shape and the perceived angular size of each light-emitting element;
   compute a colour value for each light-emitting element in the set based on the rasterization of the at least one graphical element; and
   produce a synthetic light field displaying the at least one graphical element via the multiscopic display, using computed colour values for the light-emitting elements in the set.

2. The system of claim 1, further comprising an optical combiner arranged on an optical path of the multiscopic display, wherein the perceived shape and the perceived angular size of each light-emitting element in the set are determined based further on a curvature of the optical combiner.

3. The system of claim 1, wherein the at least one processor is configured to determine, for each light-emitting element in the set, a perceived angular distance between said light-emitting element and at least one neighbouring light-emitting element in the set, from the perspective of the given eye,
   wherein the at least one graphical element is rasterized based further on the perceived angular distance.

4. The system of claim 1, further comprising at least one real-world-facing camera, wherein the at least one processor is configured to:
   capture at least one real-world image of a real-world environment whose real-world light field is optically combined with the synthetic light field, using the at least one real-world-facing camera; and
   determine, for each light-emitting element in the set, at least one of: (i) a colour of a portion of the real-world light field corresponding to a direction in which light from said light-emitting element is directed, (ii) an intensity of said portion of the real-world light field, (iii) a distance between the given eye and a real-world object located along said direction, (iv) a motion vector indicating motion of the real-world object relative to the image plane, based on the at least one real-world image,
   wherein the colour value for said light-emitting element is computed based further on the at least one of: (i) the colour, (ii) the intensity, (iii) the distance, (iv) the motion vector.

5. The system claim 1, wherein the at least one processor is configured to:
   determine a gaze direction of each eye of the at least one user, using the tracker; and
   select, from among a plurality of graphical elements, the at least one graphical element to be rasterized for the given eye, based on a gaze direction of the given eye.

6. A method comprising:
   determining a relative location of each eye of at least one user with respect to an image plane of a multiscopic display using a tracker, the multiscopic display comprising an array of light-emitting elements and a multiscopic optical element arranged on an optical path of the array;
   determining a three-dimensional (3D) bounding volume within which at least one graphical element is to be rasterized for a given eye of an individual one of the at least one user, based on a relative location of the given eye with respect to the image plane;
   identifying, for the given eye, a set of light-emitting elements in the array from which light, after passing through the multiscopic optical element, is directed toward the given eye along directions that intersect the 3D bounding volume;
   determining, for each light-emitting element in the set, a perceived shape and a perceived angular size of said light-emitting element from a perspective of the given eye, based on the relative location of the given eye with respect to the image plane, and optical distortion parameters of the multiscopic optical element;
   rasterizing the at least one graphical element onto the set of light-emitting elements based at least on relative perceived positions of the light-emitting elements of the set from the perspective of the given eye, and the perceived shape and the perceived angular size of each light-emitting element;
   computing a colour value for each light-emitting element in the set based on the rasterization of the at least one graphical element; and
   producing a synthetic light field displaying the at least one graphical element via the multiscopic display, using computed colour values for the light-emitting elements in the set.

7. The method of claim 6, wherein the perceived shape and the perceived angular size of each light-emitting element in the set are determined based further on a curvature of an optical combiner arranged on an optical path of the multiscopic display.

8. The method of claim 6, further comprising determining, for each light-emitting element in the set, a perceived angular distance between said light-emitting element and at least one neighbouring light-emitting element in the set, from the perspective of the given eye,
wherein the at least one graphical element is rasterized based further on the perceived angular distance.

9. The method of claim 6, further comprising:
capturing at least one real-world image of a real-world environment whose real-world light field is optically combined with the synthetic light field, using at least one real-world-facing camera; and
determining, for each light-emitting element in the set, at least one of: (i) a colour of a portion of the real-world light field corresponding to a direction in which light from said light-emitting element is directed, (ii) an intensity of said portion of the real-world light field, (iii) a distance between the given eye and a real-world object located along said direction, (iv) a motion vector indicating motion of the real-world object relative to the image plane, based on the at least one real-world image,
wherein the colour value for said light-emitting element is computed based further on the at least one of: (i) the colour, (ii) the intensity, (iii) the distance, (iv) the motion vector.

10. The method of claim 6, further comprising:
determining a gaze direction of each eye of the at least one user, using the tracker; and
selecting, from among a plurality of graphical elements, the at least one graphical element to be rasterized for the given eye, based on a gaze direction of the given eye.

* * * * *